(12) United States Patent  
Ledford et al.

(10) Patent No.: US 6,962,378 B2  
(45) Date of Patent: Nov. 8, 2005

(54) ADJUSTABLE SAFETY BUMPER

(75) Inventors: Kimble Eddie Ledford, Dahlonega, GA (US); John Aaron Gaddis, Dahlonega, GA (US); Alexander Frank Warchol, Dahlonega, GA (US); Mack D. Stephens, Roswell, GA (US)

(73) Assignee: Transfreight Technology, LLC, Dahlonega, GA (US)

( * ) Notice: Subject to any disclaimer, the term of this patent is extended or adjusted under 35 U.S.C. 154(b) by 0 days.

(21) Appl. No.: 10/860,711

(22) Filed: Jun. 3, 2004

(65) Prior Publication Data

US 2004/0217604 A1 Nov. 4, 2004

Related U.S. Application Data

(63) Continuation of application No. 10/293,374, filed on Nov. 12, 2002, now Pat. No. 6,764,116.

(60) Provisional application No. 60/383,942, filed on May 30, 2002, provisional application No. 60/349,499, filed on Jan. 18, 2002.

(51) Int. Cl.[7] .............................................. B60R 19/02
(52) U.S. Cl. ....................... 293/102; 293/131; 293/118
(58) Field of Search ............................... 293/102, 131, 293/118, 117, 140; 280/433, 511; 267/248; 182/89; 180/251

(56) References Cited

U.S. PATENT DOCUMENTS

| | | | | |
|---|---|---|---|---|
| 868,352 A | * | 10/1907 | Marr | 182/89 |
| 2,890,076 A | * | 6/1959 | Baechler | 293/140 |
| 3,771,824 A | * | 11/1973 | Applegate | 293/131 |
| 3,913,963 A | * | 10/1975 | Persicke | 293/131 |
| 4,247,138 A | * | 1/1981 | Child | 293/131 |
| 4,397,594 A | * | 8/1983 | Hammonds et al. | 280/433 |
| 4,470,211 A | * | 9/1984 | Rossmann | 280/511 |
| 4,514,002 A | * | 4/1985 | McIntosh | 293/118 |
| 4,541,661 A | * | 9/1985 | Hawk | 293/117 |
| 4,582,351 A | * | 4/1986 | Edwards | 293/102 |
| 4,778,162 A | * | 10/1988 | Borlinghaus | 267/248 |
| 4,979,770 A | * | 12/1990 | Shal-Bar | 293/131 |
| 5,360,311 A | * | 11/1994 | Lutz et al. | 293/118 |
| 5,673,953 A | * | 10/1997 | Spease | 293/118 |
| 6,176,529 B1 | * | 1/2001 | Kitzmiller et al. | 293/102 |
| 2001/0030431 A1 | * | 10/2001 | Killday | 293/118 |
| 2002/0108799 A1 | * | 8/2002 | Price | 180/251 |
| 2005/0017519 A1 | * | 1/2005 | Regnell et al. | 293/118 |

FOREIGN PATENT DOCUMENTS

| | | | |
|---|---|---|---|
| GB | 1586727 | * | 1/1978 |
| GB | 1587489 | * | 5/1978 |

* cited by examiner

*Primary Examiner*—Kiran B. Patel
(74) *Attorney, Agent, or Firm*—Gregory Scott Smith; Smith Frohwein Tempel Greenlee Blaha LLC

(57) ABSTRACT

A fully adjustable bumper system that absorbs impact and thereby, avoiding damage to the bumper. The bumper system includes a bumper assembly mounted to a vertically pivoting assembly through horizontally and vertically adjustable assemblies. A stop assembly is attached to the vertically pivoting assembly and allows the bumper assembly to pivot away from an applied force and then causes the bumper assembly to return to its position with the force is removed. The bumper system can be bolted, welded or otherwise fixedly attached to either the frame or rails of a trailer or truck for ease of installation.

4 Claims, 6 Drawing Sheets

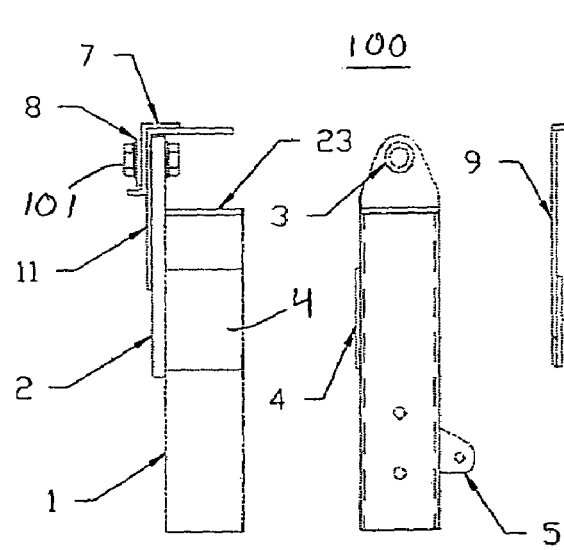
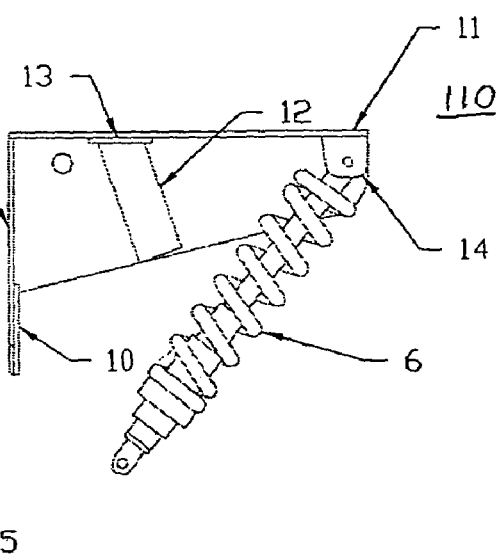
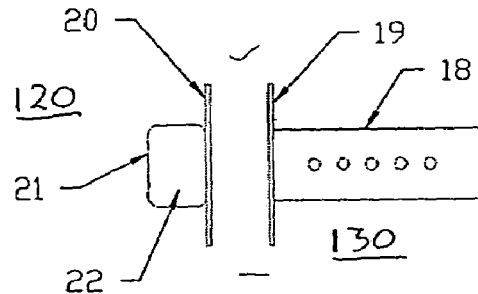
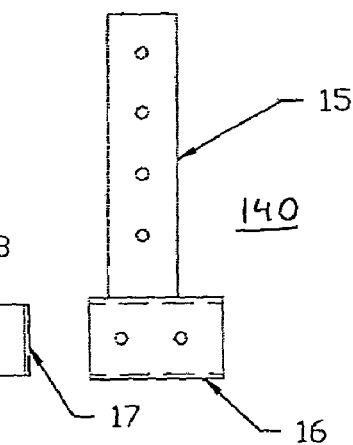

SCALE: GRAPHICAL

0' 4" 8'  1'-4"   2'-8'   4'-0"

SCALE: GRAPHICAL

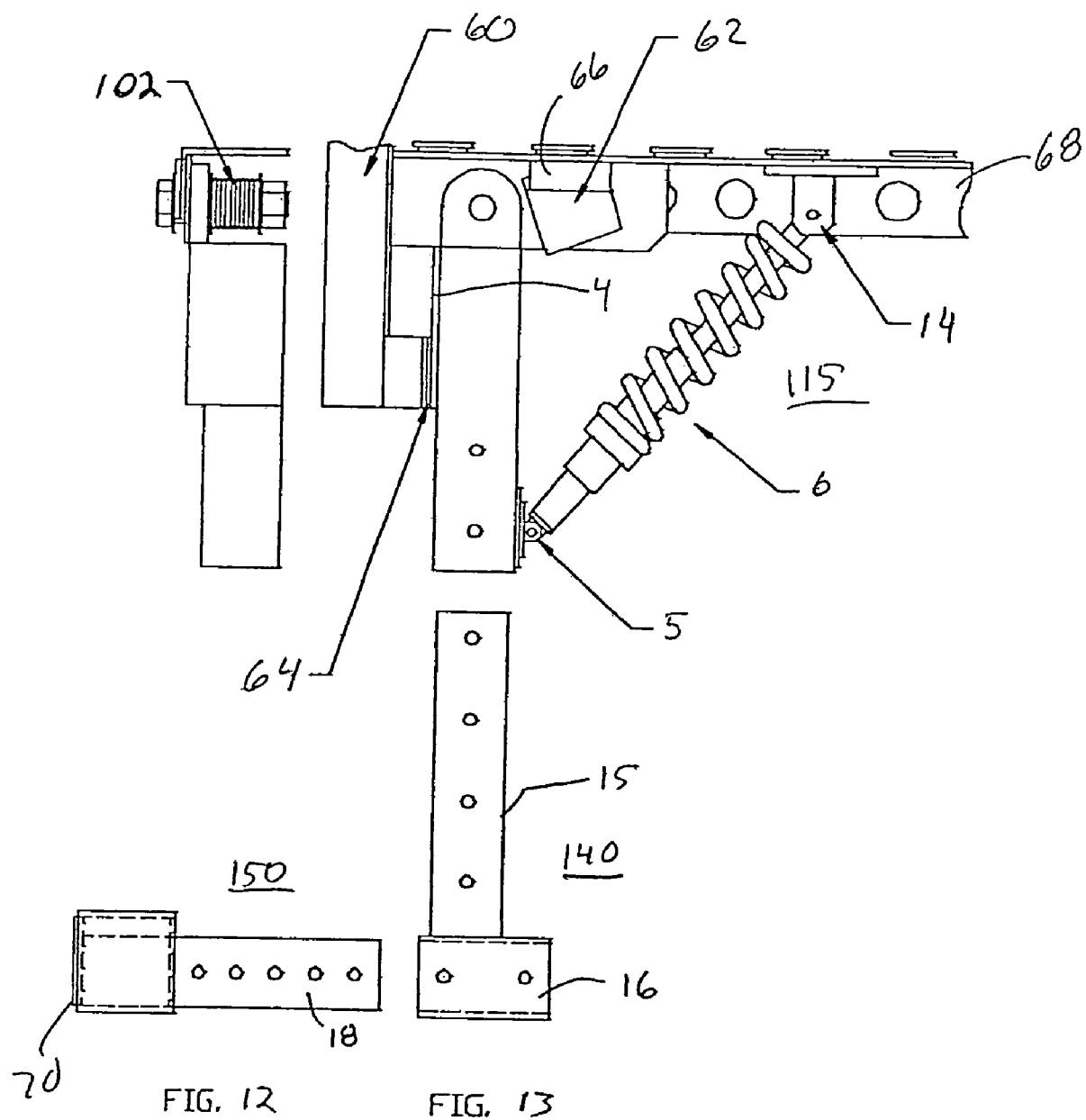

70

0" 2" 4"  8"       1'-4"      2'-0"

SCALE: GRAPHICAL

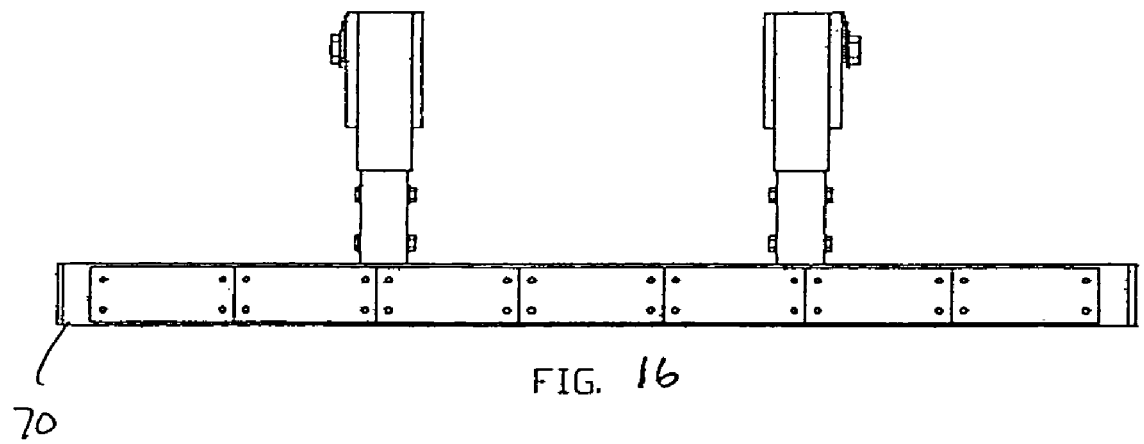
FIG. 16
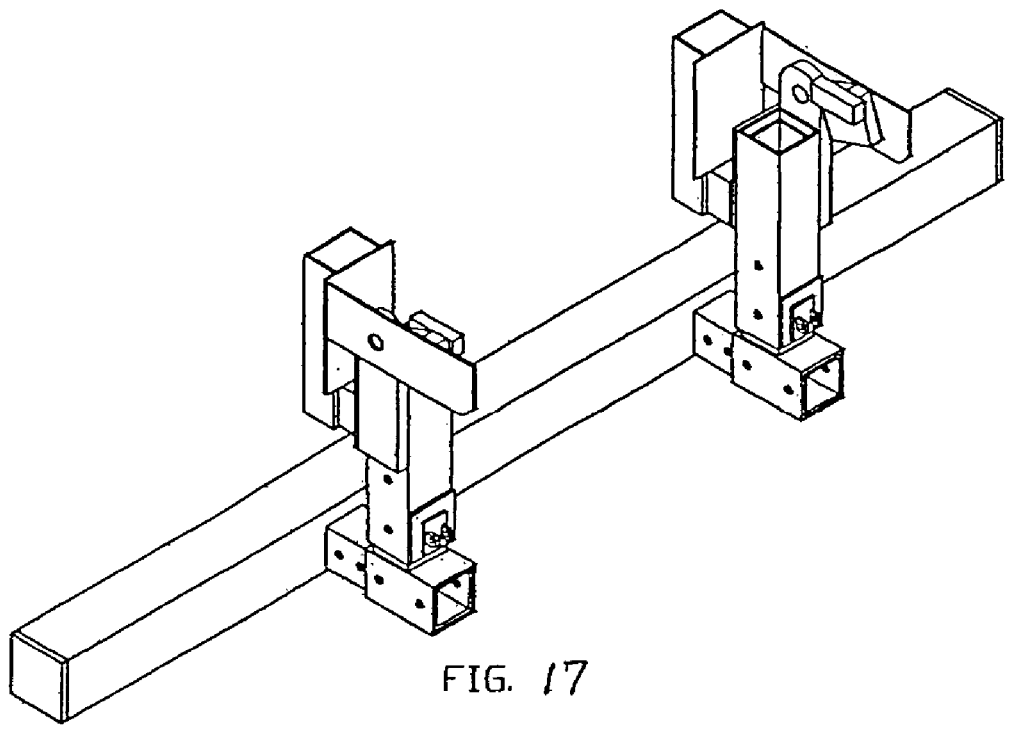
FIG. 17
SCALE: GRAPHICAL

ADJUSTABLE SAFETY BUMPER

CROSS REFERENCE TO RELATED APPLICATIONS

This application is a continuation of U.S. patent application Ser. No. 10/293,374 filed on Nov. 12, 2002 now U.S. Pat. No. 6,764,116, which claims the benefit of U.S. Provisional Application Ser. No. 60/383,942 filed on May 30, 2002 and U.S. Provisional Application for Patent Ser. No. 60/349,499 filed on Jan. 18, 2002.

TECHNICAL FIELD

The present invention relates to the trucking industry and, more particularly to bumper systems for trucks and trailers.

BACKGROUND OF THE INVENTION

The Department of Transportation ("DOT"), among other things, provides regulations for controlling the safety of the trucking industry. One of the areas regulated by the DOT is the configuration and use of bumpers on tractor-trailers and trucks. One of the key factors driving the regulations concerning bumpers is the protection of automobile drivers. The operating environment for trucks and tractor-trailers can easily result in the occurrence of damage to a bumper. This damage can often times result in the bumper falling outside of the DOT regulations. To ensure conformance with DOT regulations, it is necessary to inspect the bumpers of truck and tractor trailers, and periodically repair or replace the same. This process can be expensive and time consuming. Thus, there is a need in the art for a technique to reduce the expense associated with maintaining conformance with DOT regulations pertaining to truck and tractor-trailer bumpers.

Currently, most bumper configurations are rigidly mounted to a frame or some sort of a non-rebounding impact absorption means. Both of these configurations result in the need for the repair or replacement of a bumper that has been subject to an impact (i.e., backing into the loading dock or being struck by another moving vehicle from behind). Thus, current bumper configurations are subject to permanent deformation upon impact. The replacement or repair of such bumpers can be quite costly. The labor cost can be costly but even more important, is the potential revenue lost while the truck or tractor-trailer is taken out of commission. Thus, there is a need in the art for a bumper system that can reduce the need for replacement or repair due to impact and to reduce the cost associated with maintaining the trucks and tractor-trailers in commission.

Currently, bumpers are attached to trucks and tractor-trailers by being welded to the frame of the vehicle or trailer. To replace such a bumper, costly labor is necessary to cut the bumper free and weld a new or repaired bumper in its place. Thus, there is a need in the art for a bumper system that can be more easily replaced and at a reduced cost.

The rugged operating environment for trucks and tractor-trailers often results in damage being incurred. One common situation is the damage incurred while backing a truck or trailer up to a loading dock. It would be greatly beneficial to have a mechanism that could warn a truck driver that contact with an object has been made and thus, allow the driver to stop the vehicle and prevent the occurrence of damage. Thus, there is a need in the art for a contact warning mechanism for bumpers.

Due to the stringent regulations promulgated by the DOT, it has been difficult to conceive of a bumper system that can meet the above-identified needs in the art, as well as maintain conformance with the DOT regulations. This is especially true in attempting to conceive of a universally adaptable bumper system that can be utilized on a wide variety of trucking platforms. For instance, the DOT regulations require that a rear bumper must maintain a distance of 22 inches from the ground, even after being deformed through contact. Typical bumpers that allow for movement during impact result in a violation of this regulation. Thus, there is a need in the art for a bumper system that addresses the above-identified needs in the art and that maintains conformance with DOT regulations.

What is needed, therefore, is a bumper configuration that is less susceptible to damage caused by impact, and thus can help reduce the cost associated with the repair or replacement of the bumper, can provide an impact warning indicator to the driver and that maintains conformance with DOT regulations.

SUMMARY OF THE INVENTION

In general, the present invention is a fully adjustable bumper system that absorbs impact to avoid damage to the bumper. More superficially, the present invention can be described as a bumper system that includes a bumper assembly mounted to a vertically pivoting assembly through horizontally and vertically adjustable assemblies. A stop assembly is attached to the vertically pivoting assembly and allows the bumper assembly to pivot away from an applied force and then causes the bumper assembly to return to its position with the force is removed. The bumper system of the present invention can be bolted, welded or otherwise fixedly attached to either the frame or rails of a trailer or truck for ease of installation.

BRIEF DESCRIPTION OF THE DRAWINGS

FIG. 1 is a front and side view of the vertical pivoting assembly.

FIG. 2 is a two side view of the stop assembly.

FIG. 3 is a side view bumper assembly.

FIG. 4 is a side view of the horizontal adjustment assembly.

FIG. 5 is a side view of the vertical adjustment assembly.

FIG. 10 is a side view of the front stop assembly of an alternate embodiment of the present invention.

FIG. 11 is a side view of an alternate embodiment of the stop assembly of the present invention.

FIG. 12 is a side view of an alternate embodiment of the bumper assembly of the present invention.

FIG. 13 is a side view of the vertical adjustment assembly.

FIG. 16 is a front view of another embodiment of the assembled bumper system.

FIG. 17 is a perspective view of another embodiment of the assembled bumper system.

DETAILED DESCRIPTION

Figure 8:
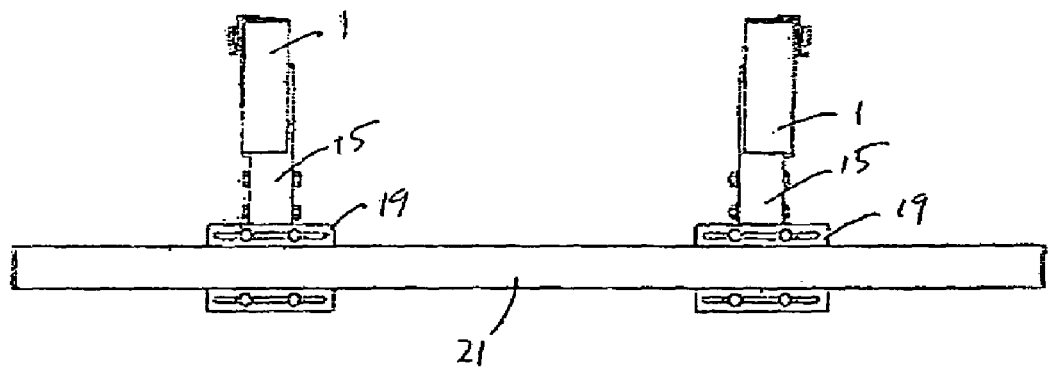
FIG. 8 is a front view of one embodiment of the assembled bumper system.

Now, turning to the figures in which like labels represent like elements through out the figures, embodiments of the present invention are provided. In one embodiment of the present invention, five sub-assemblies are utilized. These sub-assemblies can best be seen in conjunction with FIGS. 8 and 9 and include a bumper 21, a horizontal adjustment arm (16. 17 and 18), a vertical adjustment arm (15 and 16), a vertical pivoting assembly (5, 6 and 14 of FIGS. 1 and 2) and a stop assembly (12 and 13). Note that in this embodiment, two vertical adjustment, horizontal adjustment, vertical pivoting and stop assemblies are shown in conjunction with a common bumper. Those skilled in the art will understand that the present invention could also be implemented using only one such assemblies or more than two and that the present description is just an illustrative description on one embodiment.

Figure 6:
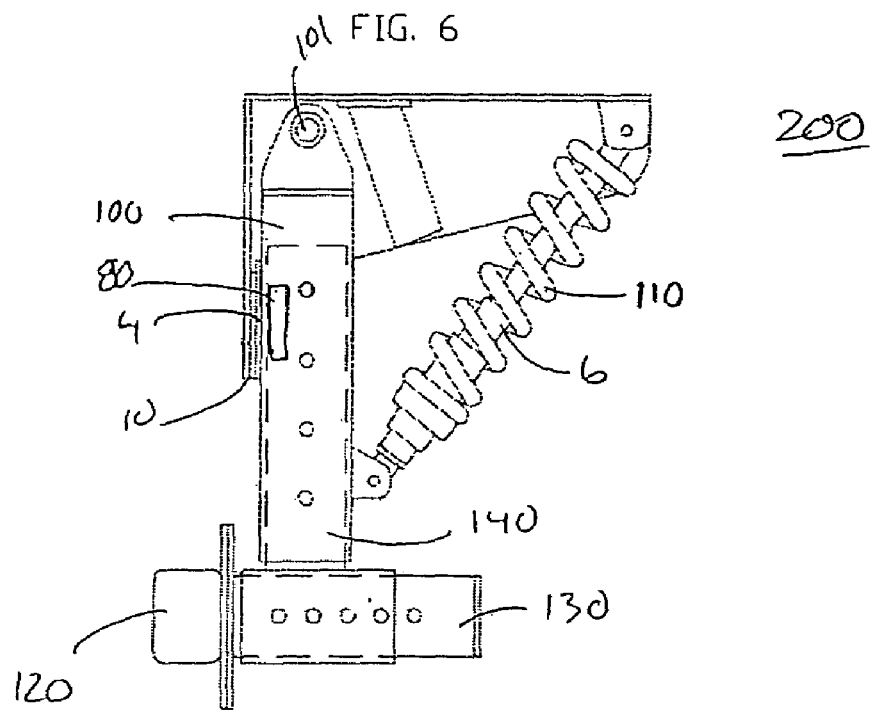
FIG. 6 is a side view of the bumper system of the present invention in the extended, or at rest position.

FIG. 1 is a front and side view of the vertical pivoting assembly 100. The vertical pivoting assembly 100 includes a vertical adjustment receiver tube 1 that is fixedly attached to a pivoting bracket 2. The pivoting bracket 2 contains a bushing 3 to allow for free rotation. A strike plate 4 is also fixedly attached to the adjustment receiver tube 1. The strike plate is needed for the extended or non-compressed position as shown in FIG. 6. Opposite the strike plate 4 is a lower shock bracket 5. The lower shock bracket 5 is welded to the receiver tube 1. The shock bracket 5 is attached to a shock absorber 6 through some fastening means such as a pin, bolt, cog-pin or the like. An end cap 23 is fixedly attached to the top of the vertical adjustment receiver tube 1. The vertical pivoting assembly 100 is attached to a vehicle, such as a trailer, by being fixedly attached to the slide rails 7. In the preferred embodiment, a bolt 101 is used to fixedly attach the vertical pivoting assembly 100 to the slide rails 7 through a spacer plate 8.

Figure 9:
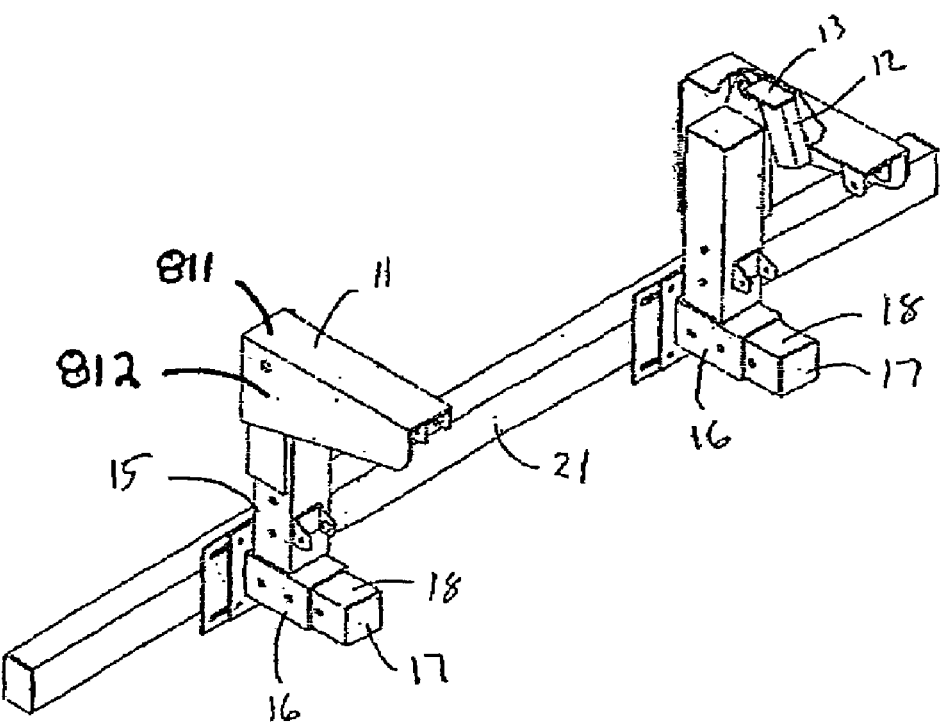
FIG. 9 is a perspective view of one embodiment of the assembled bumper system.
Figure 14:
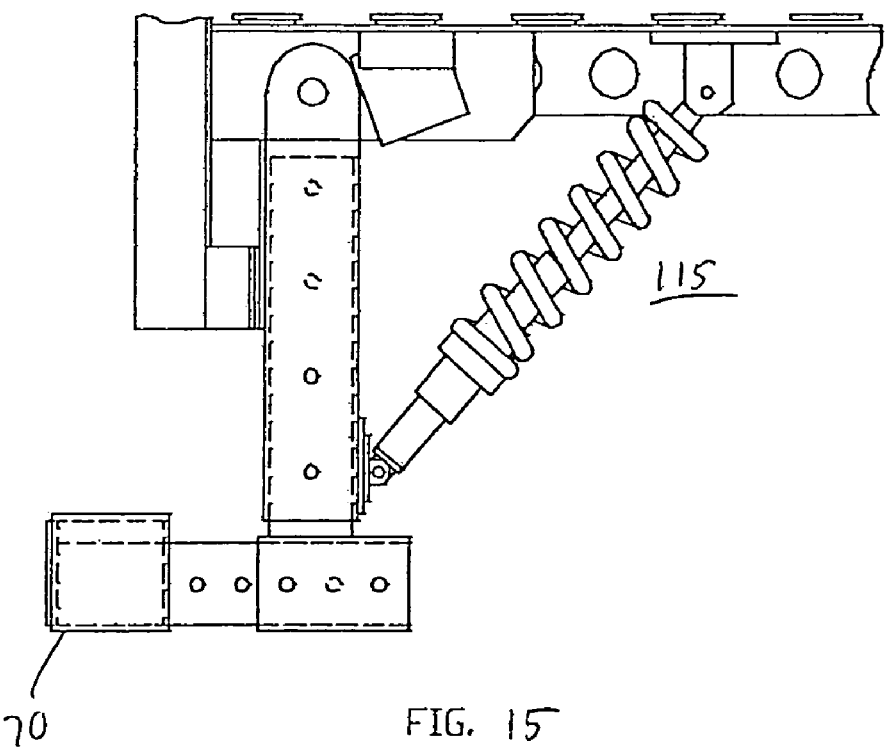
FIG. 14 is a side view of an alternate embodiment of the bumper system of the present invention in the extended, or at rest position.
Figure 15:
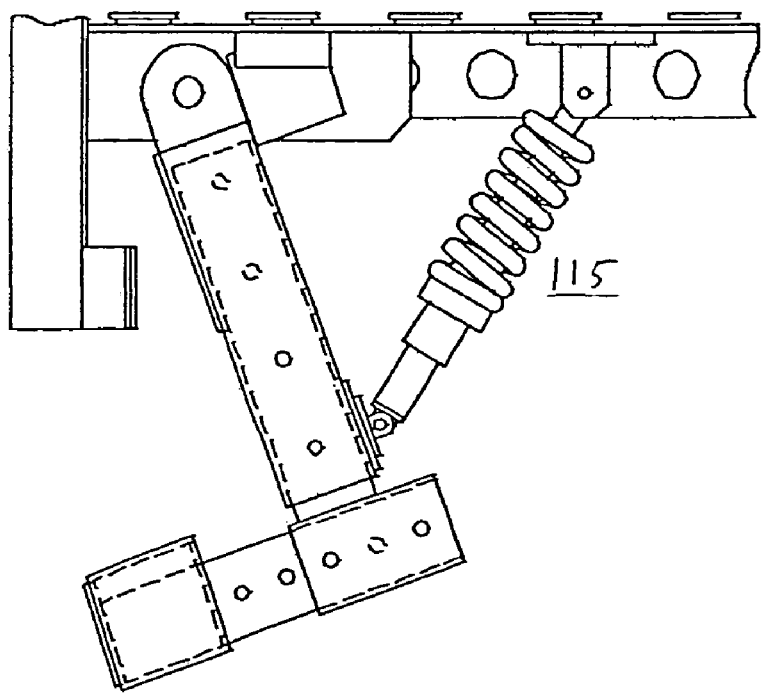
FIG. 15 is a side view of an alternate embodiment of the bumper system of the present invention in the retracted or engaged position.

FIG. 2 is a two-side view of the stop assembly 110. The stop assembly 110 includes stops for the extended or non-compressed position and a retracted or compressed position of the vertical pivoting assembly 100. The stop assembly for the extended position includes a front plate 9 and a phenolic plate 110. The front plate 9 is shown as being fixedly attached to the housing 11 of the stop assembly 110 and the trailer bumper (not shown). The phenolic plate 10 acts as a buffer between the vertical front plate 9 and the strike plate 4. As illustrated in FIG. 9, the housing 11 includes a top plate 811 and a side plate 812.

The stop assembly 110 also includes a stop block 12 and a strengthening plate 13. Both of these elements are fixedly attached to the housing 11 of the stop assembly 110. The stop block 12 may be fixedly attached to the housing 11 at an angle that permits the vertical pivoting assembly 100 to rotate the bumper 21 under the trailer to the retracted position. An upper shock bracket 14 is fixedly attached to the housing 11. Similar to the lower bracket 5, the upper bracket 14 is attached to the shock absorber 6 via a pin. The skilled artisan will realize that the shock absorber 6 can take on a variety of configurations and the present invention is not limited to any particular configuration. What is important is that a device that allows movement of the vertical pivoting assembly 100 from an extended position (the rest position) to a retracted position upon the application of a force against the bumper 21 and the returning of the vertical pivoting assembly 100 to the extended position upon the removal of the force against the bumper 21. The entire stop assembly 110 is fixedly attached to the trailer slide rails or other portion of the frame of a truck or trailer.

FIG. 3 is a side view bumper assembly. The bumper assembly 120 includes the bumper 21 and one or more adjustment plates 20. Each adjustment plate 20 is fixedly attached to the bumper 21. An end cap 22 is fixedly attached to each end of the bumper 21. Across the top of the bumper 21, safety grid or threads, as well as a rubber coating, can be placed; however, these details are not illustrated in the figures.

FIG. 4 is a side view of the horizontal adjustment assembly 130. The horizontal adjustment assembly 130 includes one or more bumper receiver plates 19, a horizontal adjustment arm 15 associated with each bumper receiver plate 19 and an end cap 17. The horizontal adjustment arm 15 is fixedly attached at one end to the planer surface of the bumper receiver plate 19. The end cap 17 is fixedly attached to the other end of the horizontal adjustment arm 15. Along one plane of the horizontal adjustment arm 15 is a series of holes, penetrating through the horizontal adjustment arm 15, and spaced along the side of the horizontal adjustment arm. The adjustment plates 20 of the bumper assembly 120 attach to the bumper receiver plates 19. In the preferred embodiment, the adjustment plates 20 are attached to the bumper receiver plates 19 through the use of eight bolts. In addition, preferably either the bumper receiver plates 19 or the adjustment plates 20, and maybe both, have slots in order to allow for adjustments of the spacing of the trailer or chassis slide rails. This aspect of the invention enables the present invention to be adaptable for use on a variety of vehicle types.

FIG. 5 is a side view of the vertical adjustment assembly 140. The vertical adjustment assembly includes one or more horizontal receiver tubes 16 fixedly attached to a vertical adjustment arm 15. The vertical adjustment arm 15 slideably engages and fits within the vertical adjustment receiver tube 1. Both the vertical adjustment arm 15 and the vertical receiver tube 1 include a series of holes penetrating through the elements and when they are slideably engaged, one or more pair of holes (one on each element) can be aligned. The vertical adjustment arm is held in a position within the vertical adjustment receiver tube 1 preferably by the use of one or more pins or bolts that are slid through the aligned holes. Similarly, the horizontal adjustment arm 18 slideably engages and fits within the horizontal receiver tube 16 and is held in place by one or more pins or bolts passing through aligned holes penetrating both the horizontal receiver tube 16 and the horizontal adjustment arm 18. It should be apparent that the use of multiple holes at various spacing configurations in the vertical adjustment arm 15, vertical receiver tube 1 horizontal adjustment arm 18 and horizontal receiver tube allow the assemblies to be adjusted vertically and horizontally, thereby accommodating various trailer and truck sizes and styles.

FIG. 6 is a side view of the bumper system 200 of the present invention in the extended, or at rest position. In this position, the vertical pivoting assembly 100 is in a substantially perpendicular position to a ground plane (not shown) and the strike plate 4 is resting against phenolic plate 10. The shock absorber 6 is in a non-compressed position.

Figure 7:
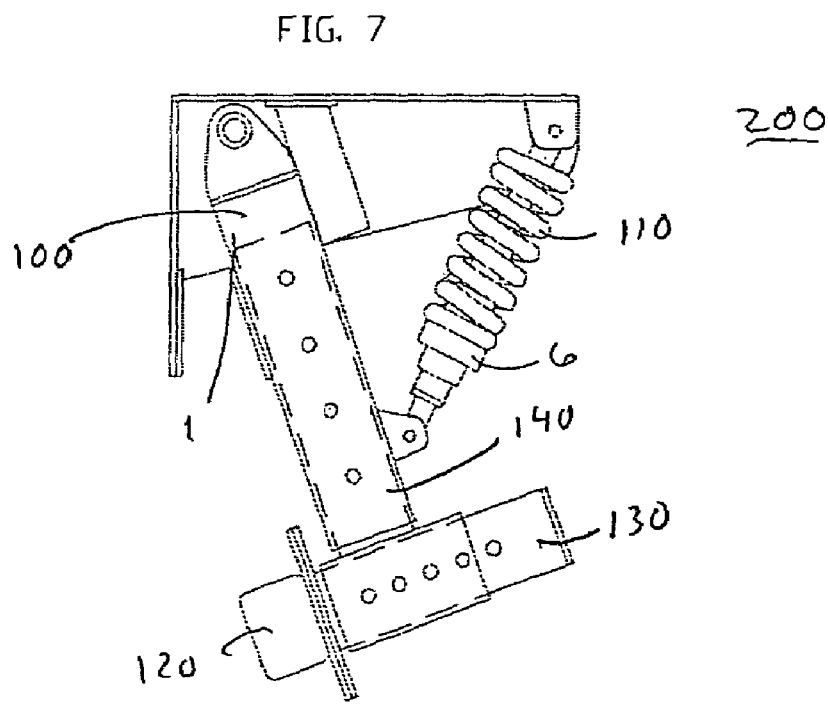
FIG. 7 is a side view of the bumper system of the present invention in the retracted or engaged position.

FIG. 7 is a side view of the bumper system 200 of the present invention in the retracted position. In this position, the vertical pivoting assembly 100 is rotated until a surface of the vertical receiver tube 1 comes to rest against the stop block 12. The shock absorber 6 is in a compressed position.

FIGS. 10 to 17 illustrate another embodiment of the present invention. In this embodiment, an alternate stop assembly 115 is illustrated. The stop assembly 115 includes stops for the extended or non-compressed position and a retracted or compressed position of the vertical pivoting assembly 100. The stop assembly for the extended position includes a front stop block 64 that engages the strike plate 4 of the vertically pivoting assembly 100. The front stop block 64 is fixedly attached to front stop assembly 60 that is attached to the frame or chassis of the vehicle using a bolt 102. The stop assembly 110 also includes a backstop block 62 and an attachment block 66. Both of these elements are fixedly attached to the housing 68 of the stop assembly 115. The backstop block 12 may be fixedly attached to the housing 68 at an angle that permits the vertical pivoting assembly 100 to rotate the bumper assembly 150 under the trailer to the retracted position. An upper shock bracket 14 is fixedly attached to the housing 68. Similar to the lower bracket 5, the upper bracket 14 is attached to the shock absorber 6 via a pin.

The bumper assembly 150 of this embodiment includes the horizontal adjustment arm 18, however, a bumper 70, includes multiple mounting holes so that the horizontal adjustment arms 18 can be mounted to various positions of the bumper 70. This aspect of this embodiment allows the bumper to be more universally adaptable to a variety of trucks types and styles.

Thus, the present invention provides an improvement for currently available bumpers for trucks and trailers. The improved bumper assembly of the present invention can be installed in new trucks and/or trailers shipped from the manufacturer. In addition, existing trucks and trailers can be retrofitted to include the bumper system of the present invention.

On advantage of the present invention is the shock-absorbing capability of the bumper system. Upon receiving impact, the bumper pivots away from the force (eg. in the case of a rear bumper, the bumper pivots toward the front of the vehicle). Thus, unlike current bumper systems, impact to the bumper will not necessarily result in a permanent deformation of the bumper system. In stead, the shock absorber absorbs the impact as the bumper pivots under the impact force. In a preferred embodiment, the bumper system can allow for up to 20 degrees for the bumper assembly to pivot. The shock resistance of the stop assembly can be adjusted to different levels according to the environment and specific requirements for the operator. For instance, different resistances can be utilized depending on the size of the truck or trailer and the weight of the loads. The shock absorbers can also include a spring, mounted in parallel to the shock absorber or mounted otherwise, to ensure tension is applied to the bumper assembly throughout the rotation range.

Another advantage of the present invention is the adjustability of the bumper system. The bumper system of the present invention can be adjusted horizontally (depth) and vertically (height).

Another advantace of the present invention is that installation and removal of the bumper system is greatly improved. Rather than being welded on at the factory, the bumper system of the present invention can be mounted to a truck or trailer through a series of bolts. Thus, a damaged bumper assembly can be removed and replaced without requiring cutting or welding.

Another advantage of the present invention is the provision of a contact warning capability mounted to the bumper. A sensor 80 (shown in FIG. 6) can be included in the bumper system to determine when the strike plate 4 and the phenolic plate 10 are not in contact. This condition indicates that a force is being exerted against the bumper assembly. A notification can then be provided to the driver either through a wireless transmission to a receiver, or by turning on an indicator light or audible warning signal.

Another advantage of the present invention is that as the bumper system moves between the extended and retracted positions, the height of the bumper does not fall out of DOT height regulations. In the present invention, because the front of the bumper assembly extends in front of the pivotal point of the vertical pivoting assembly 100, as movement from the extended position to the retracted position occurs, the bumper actually moves closer to the ground.

Thus, as can be seen, the present invention provides a bumper system that is novel and useful. The shock-absorbing bumper will help prevent costly damage to itself, and the trailer or truck it is mounted to, during routine dockings. The contact warning system notifies the driver when the vehicle has made contact with another object. The bumper system of the present invention can be easily installed in new or used equipment and can easily be replaced if damaged. The bumper system of the present invention is fully adjustable for desired horizontal and vertical positions and meets current DOT regulations through the entire range of motion.

Although this disclosure describes the present invention in terms of exemplary embodiments, the invention is not limited to the disclosed embodiments. Rather, a person skilled in the art will construe the appended claims broadly, to include other variants and embodiments of the invention, which those skilled in the art may make or use without departing from the scope and range of equivalents of the invention.

What is claimed is:

1. A housing that is functional to attach a bumper system onto a vehicle, the housing comprising:
    a front plate;
    a top plate; and
    a side plate;
    the housing receiving a vertically extending element of the bumper system, the vertically extending element being attachable to at least one of the front plate, top plate, or side plates;
    an extended stop assembly and a compressed stop assembly that limits the distance that the vertically extending rail can pivot when extended or compressed; and
    the housing being attachable to a rail of a vehicle with at least one of the front plate, top plate, or side plates being flush with a surface of the rail but, excluding the plate to which the vertically extending element is attached.

2. The housing of claim 1, wherein the vertically extending element is pivotally attached to the side plate.

3. The housing of claim 1, further comprising a bracket that is located on a lower surface of the top plate near the opposite end of front plate, the bracket being operable to receive one end of a shock absorbing element, the other end of the shock absorbing element being attached to the vertically extending element of the bumper assembly.

4. The housing of claim 1, wherein the rail includes a side surface and a bottom surface and the housing can be attached to one of the side surface or bottom surface.

* * * * *